United States Patent [19]
Fanciullo

[11] 3,889,569
[45] June 17, 1975

[54] SEALING WASHER FOR HIGH TORQUE SPINNING BOLT-HEAD OUTDOOR USES

[76] Inventor: Anthony Fanciullo, 808 Fifth St., North, Bellevue, Nebr. 68005

[22] Filed: Sept. 5, 1973

[21] Appl. No.: 394,466

Related U.S. Application Data

[63] Substitute for Ser. No. 210,676, Dec. 22, 1971, abandoned, Continuation-in-part of Ser. No. 2,117, Jan. 22, 1970, abandoned.

[52] U.S. Cl. .............. 85/1 JP; 52/758 F; 85/50 R
[51] Int. Cl. .................. F16b 29/00; F16b 43/00
[58] Field of Search .......... 85/1 JP, 50 R; 52/758 F

[56] References Cited
UNITED STATES PATENTS

| | | | |
|---|---|---|---|
| 2,551,834 | 5/1951 | Ferguson | 151/7 |
| 2,983,534 | 5/1961 | Heller et al. | 85/1 JP |
| 3,247,752 | 4/1966 | Greenleaf et al. | 85/1 JP |
| 3,452,636 | 7/1969 | Cohen et al. | 85/1 JP |
| 3,606,357 | 9/1971 | Yonkers | 85/1 JP |

FOREIGN PATENTS OR APPLICATIONS

| | | | |
|---|---|---|---|
| 294,717 | 6/1967 | Australia | 85/1 JP |
| 659,486 | 10/1951 | United Kingdom | 85/1 JP |
| 866,922 | 5/1961 | United Kingdom | 85/1 JP |
| 490,136 | 2/1953 | Canada | 85/50 R |
| 61,691 | 5/1968 | Germany | 85/50 R |

Primary Examiner—Marion Parsons, Jr.
Attorney, Agent, or Firm—Hiram A. Sturges

[57] ABSTRACT

A weather resistant washer for outdoor wall or roof uses in which portions of the washer would be compressed into opening means in a work-piece means by means of spinning a bolt-head against the upper side of the washer subjecting the washer to twisting forces, the washer being very slick and having a durometer of between 50 to 80 shore, and a specific gravity between 0.913 and 0.994.

The washer having a lower section provided with a lesser diameter at its lower end than at its upper end and having bolt-engaging ridges.

The washer described in combination with a bolt and nut and applied to two lapping pieces of sheet metal of the outer wall of a building, neither of the pieces being threaded to the bolt.

13 Claims, 5 Drawing Figures

INVENTOR.
ANTHONY FANCIULLO

SEALING WASHER FOR HIGH TORQUE SPINNING BOLT-HEAD OUTDOOR USES

This application is a substitute for the applicant's patent application Ser. No. 210,676. filed Dec. 22, 1971, and titled: SEALING WASHER FOR SPINNING BOLT-HEAD APPLICATIONS AND HAVING EASE OF ASSEMBLY TO BOLT, now abandoned the latter application having been a continuation-in-part of the applicant's co-pending patent application Ser. No. 2,117, filed Jan. 22, 1970, and titled: WASHER WITH MULTIPLE SIZE ADAPTATION now abandoned. su

FIELD OF THE INVENTION

This invention is in the field of plastic washers which are disposed beneath the bolt-head in those types of application in which it is necessary to hold the nut while using a high-torque power wrench to spin the bolt-head and the washer, such as attachment of the lapping edges of sheets of metal which form parts of the outer side wall or roof of a sheet metal building.

DESCRIPTION OF THE PRIOR ART

The stated field of this invention is far different than many ordinary uses of bolts, washers, and nuts, in which latter the washers are not subjected to great temperature changes.

Far different is the field of this invention in which the application is to the lapping pieces of sheet metal of a roof or outer wall of a building where the variation in temperatures is all the way from summer temperatures at far above 100°, because of the heat of direct sunlight to temperatures far below zero.

In such uses, a first disadvantage of synthetic rubber washers such as of neoprene, will become stiff in cold weather and will crack much quicker when stiff.

A second disadvantage of neoprene is that it has a high frictional contact with both the work and the bolt-head which causes it to tend to stick to these surfaces during a high torque application and to be twisted to breakage from a "peeling out", and it is an object of this invention to provide a washer made of a material which is very slick and, therefore, does not tend to stick as much to the bolt-head and the work, whereby it will not peel out and break.

The third disadvantage of neoprene is its tendency to "weather-check". The effects of sunlight, rain, snow, and drying out on synthetic rubbers, such as neoprene, are well-known. They tend to weather-check, in other words, they become weak, leading to a danger that they may come out of place because they become what is commonly called "rotten". We have all had that experience with rubber bands that have lain outdoors in the sun and the same is true of other synthetic rubbers, such as butyl rubber used in automobile innertubes, and is also true of the synthetic rubber known as neoprene.

The fourth disadvantage of neoprene is aging. Neoprene deteriorates and becomes weak, not only from the effects of weather, but also from age itself, and for that reason, is, in my opinion, an unsatisfactory washer material from the standpoint of leakage after it has aged excessively.

Nylon has a first disadvantage that on a hot day they can be torqued down tight, but then in cold weather, the nylon will shrink, making the washers all over a building to be loose and rain-leaky.

Nylon has a second disadvantage because of its "memory", probably its worst single disadvantage for sealing washer uses. Even though a nylon washer has been pressed into a "sealing shape" under the bolt-head, yet when cool weather comes, a nylon washer will contract from shrink or memory, the tendency to seek the earlier shape the washer had before it was compressed. This nylon shrinkage makes a loose fit. So nylon washers cause leaking.

Sometimes washer of the prior art have been made of vinyl, but vinyl is a material far too soft for high-torque sealing. Vinyl washers are so soft they tend to frictionally cling or stick to the work-piece and the spinning bolt-head until they twist and split.

Some washers have been placed on the market which are made of polyvinyl chloride, sometimes called P.V.C. Also some washers are sometimes made of polyvinyl chloride mixed with other substances in one case, P.V.C. cross-linked by polymidazoline-bentohite clay complex.

Washers containing P.V.C. are so very soft, in my experience, that they can be said to have the consistency of putty or caulking compound; whereas the durometer reading of the washer of my invention being 50–85 shore as is a necessary hardness in my experience.

In contrast, the material which I use in my washer is not noticeably affected by any of the heat or cold that is experienced in the midwestern part of the United States, and in my opinion, would not be affected by the heat or cold in any part of the world. In fact, as far as heat goes, I have applied the fire of a match to washers made of the material used in the washers of my invention, and found that they do not burn or even distort, and when used on a roof, do not leak, in my experence, even though they have been used by the thousands and thousands.

As regards extreme cold, I have withdrawn my washers from long periods in a deep-freezer and applied them to work at high torque in the usual way with excellent results.

I have discovered that it is important that the bottom portion of the washer be tapered on its outer wall so as to penetrate the aligned holes in the sheet metal sufficient to make a good seal. Sometimes the holes in the sheet metal are only partially aligned and, in fact, can be called mis-aligned because they only partially lap each other. When the holes are only partially overlapping, it is even more important that the lower part of the washer have a tapered, preferably conical, outer surface.

I have tested flat washers on mis-aligned holes and have found that they do not penetrate adequately.

I have discovered that when a nylon washer that is flat on the bottom is applied to holes in flat sheet metal that are either aligned or only partially aligned, that voids can be found in the washer material when a sample cut is made diametrically through the bolt, nut, washer and sheet metal.

In the sheet metal building industry, however, the practice is to hold the nut on the inner side of the building while a power wrench is applied to the bolt-head on the outside of the building. The twisting force of the bolt-head against the washer is tremendous when the work-piece side of the washer cannot freely rotate because of friction of the bottom of the washer against the sheet metal of the building. And so in the building industry, a much more advanced and perfected washer is needed than has been available in the prior art.

Without such an advanced washer, water leakage is sure to occur in an excessively high percentage of cases in my opinion and experience.

There are several reasons why the bolt-head must be on the outside of a sheet metal building. Appearance is one reason because the bolt-head is more attractive than the nut and bolt shank. Another important reason is that the socket of a power impact wrench is often not deep enough to receive that part of a bolt shank which projects beyond the nut and workmen find it handier to use power wrenches outside of a building, particularly in roof work where the building and bolt-head give support to the weight of the power wrench. And so in roof work, the nut is held with an open end wrench underneath the roof while the bolt-head and shank and also, of course, the washer, are rotated with a power impact wrench above the roof.

For example, if an attempt is made, as in the prior art, to use a neoprene or an ordinary vinyl washer of about 40–45 durometer hardness, then such washers, being soft in character, tend to stick in place against the work-piece from friction, and will be twisted in two and destroyed.

Such soft washers tend to peel out from beneath the concave underside of the bolt-head, whereby there is no longer a sealing and leakage takes place.

A soft washer, which is substantially below a durometer of 57 in its hardness, would tend to "mushroom" out beyond the concave underside of the bolt flange during application.

If a person were to attempt to apply an extremely brittle nylon washer, of 90 shore durometer reading or over, to a use such as in the building field, the excessive hardness would prevent the washers from flowing into the holes in the sheet metal workpieces. In other words, a nylon washer of 90 durometers or over will not flow or "seat" into the work-piece hole.

Nylon has a memory. In cool weather, such washers will contract and they leak because of the loose fit they make with respect to the bolt and so they are unsuitable in the sheet metal building field also for reasons of leakage.

Another great problem in the prior art has been the problem of assembly of washers onto bolts. If they fit too tight, it is impossible to get them on without breaking them, if they fit too loose, they fall off. This problem does not exist when the washers are of material so soft that it yields as the washer is slid along the shank of the bolt because, with a soft washer, the soft washer material, because of its yielding nature, will allow adjustment in the event that the washer is somewhat too small and too tight for the bolt.

However, when such a washer is made of a hard and brittle material such as a durometer range of between 50–85 shore, and a specific gravity between 0.913 and 0.994 such as I have found desirable for use in sealing holes in metal buildings, then the brittleness of the desired washer material prevents the yielding that would, in a softer material such as rubberlike neoprene, permit ease of assembly of a smaller and tighter washer, so new assembly problems must be answered.

Neoprene, and other soft synthetic rubbers that washers are made from, simply stretch, if the bolt is too big for the washer opening.

A patent issued to Cohen et al., U.S. Pat. No. 3,452,636, issued July 1, 1969, and titled: WEATHER RESISTANT FASTENER ASSEMBLY, shows a washer having protrusions or ridges, but the Cohen washer is of a soft rubberlike neoprene type having the protrusions stated to be for the different purpose of preventing the sharp threads of a metal screw from sheering off the main body of the soft Cohen washer. This is an entirely different purpose than the need for greater ease of assembly in my twisting-force-resistant, much more brittle washer.

The Cohen washer is for metal screw work where washer-sealing problems are much lesser in tight-fitting metal screw uses than in looser bolt uses.

Metal screw work will permit use of softer washers without washer breakage because the amount of pressure on the washer required is far less than in bolt work, and in fact, the pressure is direct from metal washer cap against the work-piece, but in bolted buildings the full pressure is on the washer and during the high-pressure bolt application, there must be no bolt-head nor metal grinding against the sheet metal work-piece, but in bolted buildings the full pressure is on the washer Such a grinding removes galvanized finish from the metal and corrosion takes place swiftly.

Spinning bolt-head applied washers, I have discovered, must be much harder to prevent damage during spinning application, even of a durometer range of 50–85 shore, and a specific gravity between 0.913 and 0.994, creating great problems of assembly onto bolt-shanks whenever the hard washers are somewhat too small for the bolt shanks, as is common.

Washer-fitting-to-bolt problems are great. Bolts of a given "size rating" tend actually to have outer dimensions which vary within a tolerance range of of six to seven 1000ths of an inch making fitting too losse or too tight. If a prior art washer of the plastic type happens to fit and slip easily onto a bolt in the middle of this range during factory assembly, so that it will cling to the bolt and not become easily separated therefrom at the job site, then a rare and ideal situation is realized.

But often bolts are either at the low end of the outside diameter tolerance range, causing the washer to easily fall off, so that the bolt and washer must be handled separately; or the bolts are at the high end of the tolerance range of six to seven 1000ths of an inch and are too light to fit on.

A loose washer introduces separate operations into the work, since loose washers must be assembled onto the bolt by a workman on a job site where such assembly, as compared with machine assembly, is the least efficient and far more costly!

When the bolt diameter is at the higher end of the tolerance range, the washer will have such a tight fit that sometimes it cannot be put on the bolt at all without cracking the washer.

A hard washer that has a crack in it from excessively tight fit will tend to be squeezed completely out from under the bolt-head during the high-power wrenching that is used to attach many bolts to the work, particularly in assembling the sections of a metal building where a sealing washer is vital to prevent leakage.

Sometimes when a washer has a tight fit with the bolt, the plastic washer can be driven onto the bolt by placing a pipe over the bolt and hitting the washer with a hammer.

But the high cost of hammering hard, spin-twist resistant, washers onto bolts is a labor expense of the prior art for which a solution has long been sought.

Even through many hard washers can be hammered onto a bolt, yet quite often the fit is so tight that the washers crack during the hammering, such cracks sometimes being so small that they cannot be noticed in rapid work, but yet they are large enough to cause the washer to squeeze out from under the bolt-head during application to the work.

Another prior art problem, in addition to washer breakage and leakage problems, has been the extra labor time-cost that is involved in the difficulty of inserting the end of a bolt into the undersized opening of a tight-fitting hard washer.

SUMMARY OF THE INVENTION

A washer for uses in which portions of the washer would be compressed into opening means in a work-piece means by means of spinning a bolt-head against the upper side of the washer subjecting the washer to twisting forces, the washer having a durometer of between 50 and 80 shore, preferably between 60 and 70 shore, and a specific gravity between 0.913 and 0.994, preferably between 0.941 and 0.965.

The washer having a lower section provided with a lesser diameter at its lower end than at its upper end.

The washer described in combination with a bolt and nut and applied to two lapping pieces of sheet metal of the outer wall of a building.

A washer made of material of relatively brittle and hard nature of a durometer of between 50   85 shore, preferably 60–70 shore, and a specific gravity between 0.913 and 0.994, and having at least one elongated protrusion extending inwardly from the wall of its opening and elongated lengthwise of the opening, the protrusion being formed of elastic material which is adapted to yield sufficiently that the washer will receive and yet cling to the shanks of bolts, the opening being substantially cylindrical and the protrusion being parallel to the axis of the cylindrical configuration of the opening. In further combination with two other like protrusions so that said protrusions are disposed equidistantly around the periphery of the opening.

The protrusions each having an inner terminal edge disposed extending inwardly of the opening to a greater extent gradually toward one end of the washer from the other end so that a bolt can be more easily inserted into the opening at the one end than at the other end for ease of insertion of the bolt, the protrusions pressing against the trheads of the bolt more firmly at the other end of the washer, the opening itself being substantially cylindrical but tapering from a larger diameter at one end to a smaller diameter at the other end, the protrusions and the washer both being made of the same piece of elastic material sufficiently malleable that a change of shape occurs during normal compression without breakage of the washer during application of the bolt and washer to a work-piece, the protrusions and the washer being formed of vinyl material of the kind called high linear density polythelene material.

The washer described in combination with a bolt having threads on its exterior disposed in engagement with the protrusions, the fit being such that the pressure from the fit causes the depression of the protrusions at points in which the protrusions are engaged by the threads.

I have discovered that in an automatic assembling machine in which washers and bolts are assembled together, that a problem exists in aligning the washer with the bolt. This problem is accentuated by the fact that a bolt drops in free gravity fall about one-thirty-second of an inch before it reaches the washer. If the bolt does not align with the washer, then the washer will be ruptured and deformed and the machine will be jammed. The importance of this, when one considers that such a machine is capable of the assembly of 250 washers to 250 bolts in 1 minute, is great, from the standpoint of assembly not being accomplished during down-time for repair of a jammed machine.

For this reason, this invention provides my new concept of having the protrusions absent from an annular area extending from the top of the washer down the wall of the washer opening a distance of approximately 1½ to two 60/4ths of an inch or more, whereby the tip end of the shank of the falling bolt can be received in this area and become aligned with the washer properly before a rotating spindle of the automatic assembly machine rotates the bolt through the washer along the above the described protrusions. A rotating spindle rotates about as fast as the needle of a sewing machine reciprocates, and so the importance of proper alignment is great.

The speed of automatic assembly machines would be greatly slowed down if the fins or protrusions did not gradually taper to more inwardly extending lower ends, because if the taper was absent, when the hard material of 50 to 85 shore durometer hardness and a specific gravity beween 0.913 and 0.994 is used, then this would greatly slow down the speed of the assembly machine while the bolts have to barge their way through such a great amount of extra material.

For this same reason of preventing excessively bulky fins or protrusions from interfering with the speed of bolt insertion, I propose that the fins be each of a thickness of thirty to thirty five 1/1000ths of an inch.

I have discovered that an ideal washer in the durometer range of 50–85, and more specifically, between 60–70, can be made from material known as high density linear polyethylene, which latter is also dielectric.

An objective is to provide a washer of dielectric material which is used in connection with a bolt in such a manner that, after installation, the washer material is disposed between the bolt-head and a conductive metal work-piece preventing corrosion from electrolytic action which would otherwise occur between the bolt-head and work-piece because they are ordinarily formed of dissimilar metals.

A further object of the invention is to prevent corrosion of sheet metal plates at a place where there is no coating or plating of any kind to protect the plate, such a place being on the raw edges of bolt holes in the plates.

It is an object to so fill the bolt holes with washer material that there are no voids in the spaces between the metal plate and the bolt shand and head because, if there is a void in this area, corrosion from electrolytic action tends to take place over the years due to creeping moisture during atmospheric and temperature changes. A material of the durometer range I have above expressed as my discovery is ideal for filling in such voids and preventing such electrolytic action. A particular object is to provide a bolt and washer in combination with a building having the special problem of lapping sheet metal exterior pieces in which the bolt head and washer are on the exterior side of the building, such as the top side of a roof where rain, extreme heat, ice, and temperature variations have a maximum effect on leakage problems and in which the bolt shank has a loose fit to both of the lapped metal pieces and not a threaded fit to either the piece, whereby the washer must do a greater service of leakage prevention than is the case where a bolt shank is threaded to one of the lapped pieces, or than is the case where a bolt shank is threaded to one of the lapped pieces, or than is the case where a mere low pressure metal screw is used.

DESCRIPTION OF THE PREFERRED EMBODIMENT

Figure 1:
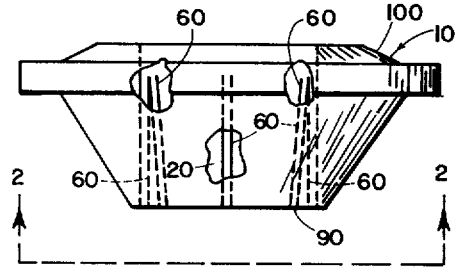
FIG. 1 is a side elevation of the washer of this invention with portions thereof broken away to show other portions therebehind.
Figure 2:
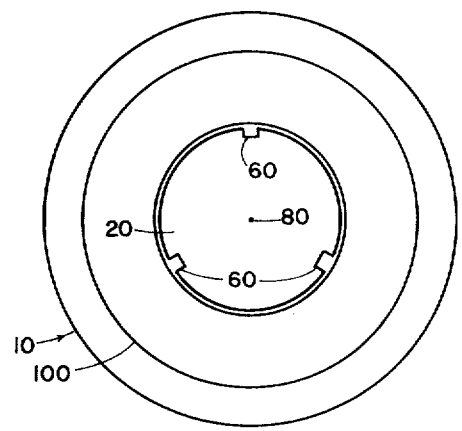
FIG. 2 is a top plan view of the washer of FIG. 1.
Figure 3:
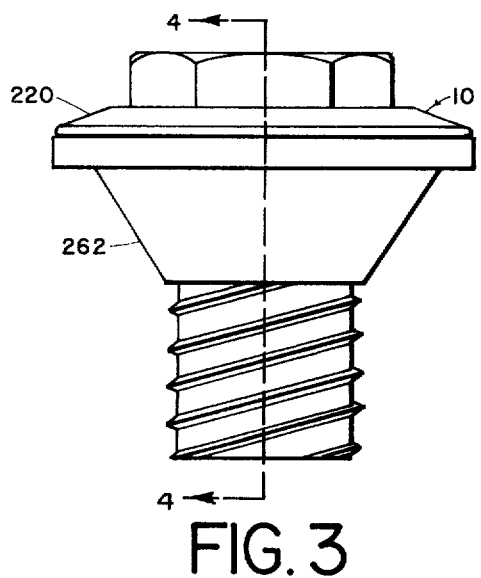
FIG. 3 is a side elevation of the washer of FIG. 1 shown as applied to a bolt.

The washer of this invention is generally indicated at 10 in FIG. 1 and has an opening 20 therethrough for receiving the shank 30 of a bolt generally indicated at 40, which latter has a head 50 disposed on the upper side of the washer.

The washer has at least one, and preferably three, elongated protrusions 60 which extend inwardly from the wall 70 of the opening 20.

Each of the protrusions 60 is formed of elastic material which is sufficiently malleable that a change of shape occurs during normal compression without breakage of the washer during application of the bolt and washer to a work-piece.

The protrusions are preferably formed of one piece with, and of the same high density linear polyethelene material as the rest of the entire washer, for low cost production.

Figure 4:
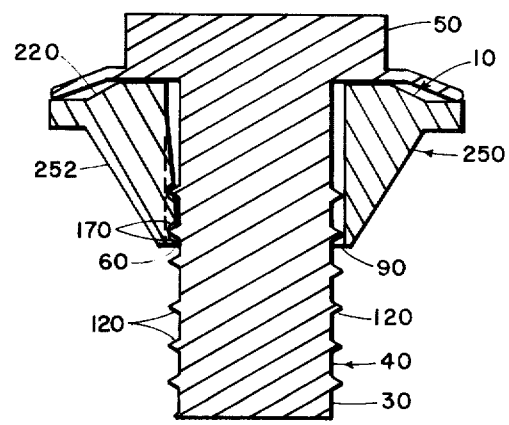
FIG. 4 is a sectional view taken along the line 4—4 of FIG. 3.

As best seen in FIG. 4, each protrusion extends substantially completely from one end to the other of the wall of the opening 20.

Each of the protrusions are preferably straight and are parallel to the axis 80 of the substantially cylindrical opening 20.

The protrusions 60 are equidistantly spaced around the periphery or circumference of the opening and each protrusion has its inner terminal edge disposed in a tapering relationship with respect to the cylindrical wall of the opening and with respect to the axis 80 of the opening such that each protrusion 60 extends inwardly of the opening toward its axis 80 to a greater extent gradually toward one end 90 of the washer from the other end 100 thereof so that a bolt can be inserted in the opening 20 at the other end 100 and so that the protrusions 60 will press against the threads 120 of the bolt firmly at the said one end 90 of the washer.

Although the wall 70 of the opening 20 is substantially cylindrical, yet it can also be said that it has a slight taper such that it is actually also frustro-conical, whereby the wall 70 of the opening 20 tapers from a larger diameter at the other end 100 to a smaller diameter at the one end 90.

In operation, the washer will be found to fit easily onto bolts of considerably varying diameters because the outermost diameter of the threads 120 of such bolts is such that the threads will be engaged by the elongated protrusions or fins 60 on these several sizes of bolts, although the extent to which the pressure of the fit causes the threads to push into the respective protrusions or fins 60, as is seen in FIG. 4, will vary with the size of the bolt diameter.

In FIG. 4, it will be seen that the plastic is first in a position such that it is pressed back only by the end of the respective threads, leaving small open spaces 170 on the top and bottom sides of each thread and between each thread and the adjacent material of the respective fin or protrusion 60.

Figure 5:
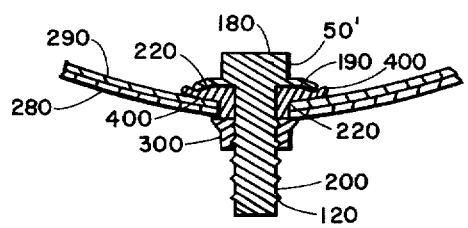
FIG. 5 is a cross-sectional view similar to FIG. 4 but showing the washer after it has been compressed between bolt-head and nut, the bolt-head being of a special type with a recess thereunder, the bolt and washer being shown as applied to two parallel pieces of sheet metal of a building.

However, as pressure is applied on the washer, the washer will tend to fill in the space between the protrusions and the spaces 170 will also be filled with material as the washer is compressed, as seen in FIG. 5.

Referring to FIG. 5, the bolt there shown is given the member 50' because it has a special head 180 having an annular recess 190 on its underside for acting as a cup, the recess 190 surrounding the shank 200 and receiving the washer 10, and particularly, an upwardly protruding annular portion 220 thereof.

The washer has a downwardly depending sealing portion 250 which has a frustro-conical outer surface 252 for engagement in the opening 260 formed by the registering openings 270 of two pieces of overlapped sheet metal 280 and 290.

When a nut 300 is drawn up on the threads 120, it will pull the head 180 down for distorting the washer so that it completely fills the opening 260 which itself will often be considerably larger than the shank of the bolt.

An effective waterproof sealing washer and bolt combination is thus produced, the washer and bolt portions of which can be handled as a single unit for rapid work on the job site.

The two pieces of sheet metal 280 and 290 should be considered to be parts of the exterior covering of a building identified at B, particularly the pieces 280 and 290 form the roof of the building in which the bolt shank 200 is disposed in vertical position.

The washer is for uses such as in the building B roof, in which portions of the washer would be compressed into opening means in a work-piece means by means of spinning the bolt-head 50 against the upper side of the washer subjecting the washer to twisting forced, the washer, as I have discovered, must be of a material having a hardness of a durometer of between 50 and 85 shore, preferably the more specific durometer range of 60 to 70 shore, and a specific gravity between 0.913 and 0.994, preferably between 0.941 and 0.965.

Soft washers of a durometer of about 45 shore or less, are so soft that, from my testing, I estimate that even perhaps 75% of them would come clear out from around the bolt-head during application.

Referring to FIG. 5, it will be seen that when the bolt and washer are completely installed through the sheets 280 and 290 of the Building B, then there will be a substantial thickness of washer material remaining between the closest sheet 290 and the bolt-head. Since the material of the washer is a dielectric material of high density linear polyethylene, the washer will prevent any electrolytic action between the metal of the bolt-head and the metal of the closest sheet 290.

Prevention of such electrolytic action and its resultant corrosion is important because bolt-heads and corrugated sheeting are commonly of two different metals or metal alloys, whereby the dissimilar metals set up an electrolytic action which is serious as measured over the years of service desired.

In FIG. 4, the angle T is identified by line 300 in FIG. 4 and by axis 80. The angle T is the angle which the outer surface 252 of the downwardly depending tapered sealing portion or lower section 250 makes the vertical axis 80 as seen in a diametrical cross-section taken through the washer and through its axis 80. The angle T defines the taper of the sealing portion 20, this is an angle of approximately 30°.

The vertical depth of the tapered lower section 250 is about three-sixteenths of an inch in the washers I use for lapping sheet metal outer walls as in FIG. 5, which latter is full scale. FIGS. 1 to 4 are four times full scale.

I made the following tests by means of placing washers on the platform of a common mail weighing scale by means of pressing a straight pin downwardly into the platic washer material in each case, with an amount of pressure sufficient to cause the scale to read various ounce readings.

First I tested one of my own washers, which latter was made of thermo plastic high density linear polyethylene of a specific gravity between 0.913 and 0.944 and a durometer range of between 50 to 85 shore, the latter hereinafter referred to as "the control sample".

The control sample was tested in this manner four times with a pressure causing the scale to read 3 ounces. In each case upon lifting the pin the washer lifted only on one side very slightly, but the washer did not completely lift, resulting in what I call a "very slight cling".

Next I tested my control washer four times at a 5 ounce scale reading with the same results as at 3 ounce, excepting that one side of the washer would lift slightly more, providing what I call a slight cling.

Next I tested my control washer four times at 6 ounces and at each time upon lifting the pin the washer lifted completely from the scale platform.

Next I tested in a similar way a washer made of vinyl material of a sort that could be called "common vinyl" of unknown durometer rating. In testing four times at 1 ounce the scale reading in the same way showed a very slight cling as defined above.

Next I tested the vinyl washer at a 2 ounce scale reading, resulting in a slight cling.

Next I tested the vinyl washer 10 times at a 3 ounce scale reading and found that upon raising the pin, the washer would lift completely from the platform in nine of the 10 times although once the pin lifted one edge only.

Next I tested the vinyl washer at a 4 ounce reading 15 times and each time the washer completely lifted from the platform upon the raising of the pin.

These tests tended to show me that a vinyl washer of a type which I would call, common vinyl — common meaning not mixed with other substances, was softer than my control sample washer becaise he vinyl washer would lift at 3 ounces; whereas mine would not lift until the pressure registered 6 ounces.

Next I tested a washer which I had made of nylon and having a durometer reading of 85 shore. It was tested 4 times each at 8 ounces, 9 ounces and 10 ounces, respectively, with the result that at 8 ounces there was a very slight cling; at 9 ounces in each case a very slight cling and at 10 ounces the complete raising of the washer from the scale platform by the pin was caused in each case. This indicated to me that the nylon washer is very hard and that my testing method was practical. But I do not prefer to use nylon washers anyway because of their problem of shrinkage because of their memory, as causes leakage.

In attaching lapping pieces of sheet metal, as shown in FIG. 5, I prefer that the torque pressure used be 65 pounds per square inch of the cross sectional area of the bolt shank, the bolts themselves having five-sixteenths of an inch diameter bolt shanks, the washers having an outermost diameter of 0.665 inch and the bolts having an exterior diameter at the upper ends of their lower conical portions of about seven-sixteenths of an inch.

As can be seen in FIG. 5, the bolt has thread-groove surfaces in non-threaded relationship to either sheet metal piece, in other words, spaced from the walls of holes in each piece 280 and 290, giving great leakage problems to be solved.

I claim:

1. A weather resistant sealing washer for outer wall or roof uses, said sealing washer being of thermoplastic material having an opening therethrough for receiving the shank of a bolt, said washer being very slick for use in application beneath a bolt-head which is spun while being tightened at a high torque, said washer material having a durometer range of 50 to 85 shore, said washer having an upper end and a lower end, said washer having an axis extending through a center of said washer opening, said washer having a lower section which has an outer surface tapering from a lower portion of lesser diameter to an upper portion of greater diameter so as to wedge into an opening in a work-piece, said washer having an upper section and having an intermediate flange section disposed between said upper and lower sections, the uppermost part of said upper section being of substantially consex configuration and of a lesser diameter than the maximum diameter of said intermediate section.

2. The sealing washer of claim 1 in which said thermoplastic material is high density linear polyethylene.

3. The combination of claim 1 in which said thermoplastic material is specifically high density linear polyethylene and the specific gravity is between 0.941 and 0.965.

4. The sealing washer of claim 1 in further combination with two pieces of lapping sheet metal having at least partially aligned holes respectively, a bolt having a head against which the upper end of said washer is disposed, and having a threaded shank receiving said washer thereon, said shank extending through said holes, and a nut around said bolt and on the opposite side of said sheet metal pieces from said washer and head, a lower portion of said washer extending at least partially into the hole of the respective adjacent piece of sheet metal, said shank threads having groove surfaces substantially spaced from the walls of the holes in both of said pieces.

5. The sealing washer of claim 4 in which said intermediate flange section extending radially outwardly beyond the head of the bolt.

6. The sealing washer of claim 1 in which said upper section is provided with an outer surface tapering from an uppermost portion of smaller diameter to a lowermost portion of larger diameter.

7. The sealing washer of claim 1 in which said intermediate section has a substantially planar annular upper surface projecting beyond said upper section and a substantially planar lower surface projecting beyond said annular lower surface, said substantially planar upper and lower surfaces of said intermediate section being disposed substantially in planes at right angles to the axis of said washer.

8. The sealing washer of claim 7 in which the exterior of said intermediate section has an outer cylindrical terminal edge symmetrical about said axis and extending between the upper and lower substantially planar surfaces of said intermediate section.

9. The sealing washer of claim 1 in further combination with a bolt having a substantially cylindrical threaded shank portion extending through said washer.

10. The sealing washer of claim 1 further comprising said washer having a protrusion means extending inwardly from the wall of said opening, said protrusion means being of a size to assist in holding said washer on a bolt of less size than the average in a group of bolts in an allowable shank diameter tolerance range, said range being at least three-thousandths of an inch, and said protrusion means also being of a size for having sufficient weakness that said protrusion means becomes sufficiently changed by a bolt passing through said washer past said protrusion means so as to permit said bolt to pass by said protrusion means, said washer being sufficiently free of any portion of said protrusion means in that portion of the inner wall of said washer opening which is disposed at one end of said opening as to permit a bolt to freely enter said one end of said opening for a distance of at least one and one-half sixty-fourths of an inch so as to substantially reduce misalignments of bolt shanks with openings in such washers during machine assembly.

11. The sealing washer of claim 1 in which said durometer range is 60 to 70 shore.

12. The sealing washer of claim 1 in which said outer surface of said lower section makes an angle with said axis of approximately 30°.

13. The sealing washer of claim 1 in which said tapering lower section has a vertical depth of approximately three-sixteenths of an inch.

* * * * *